UNITED STATES PATENT OFFICE.

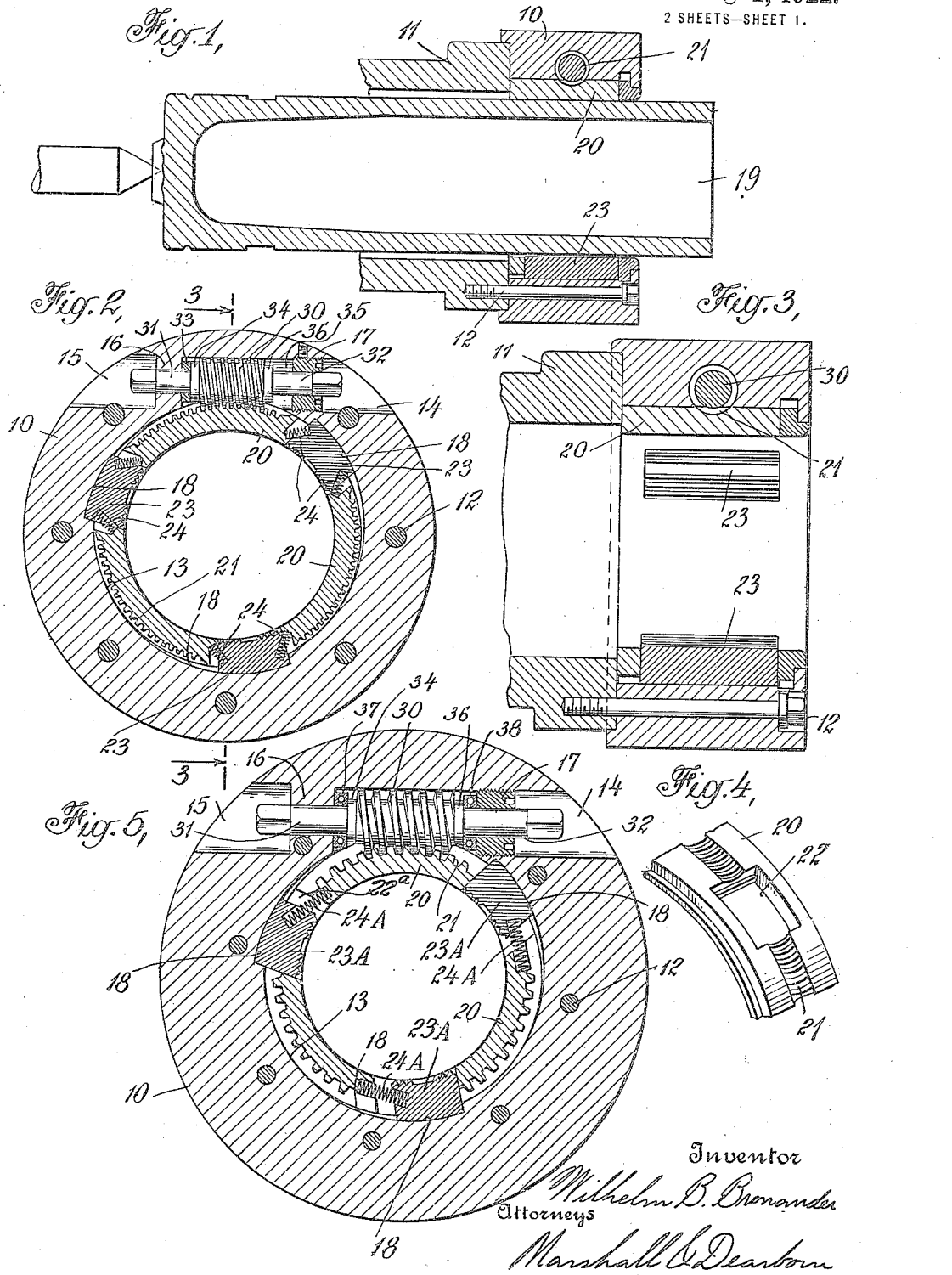

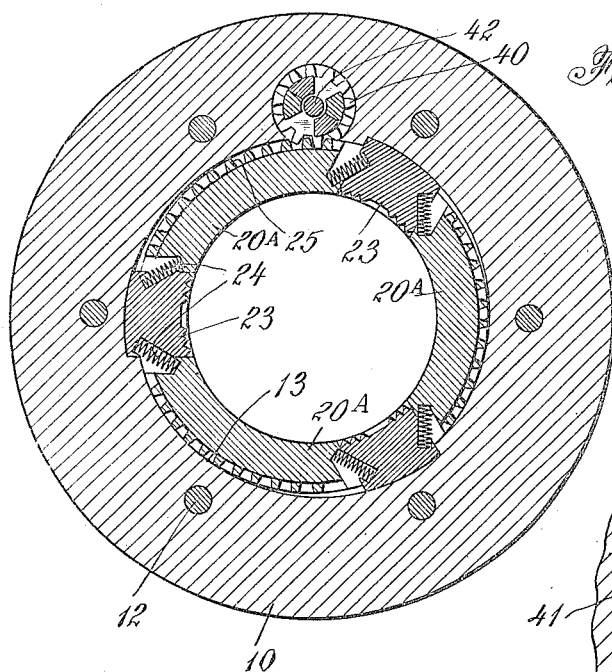
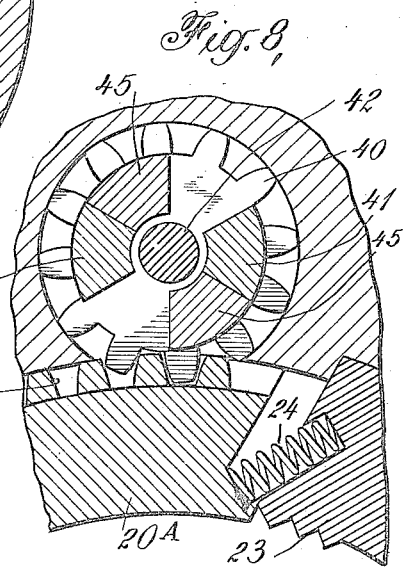
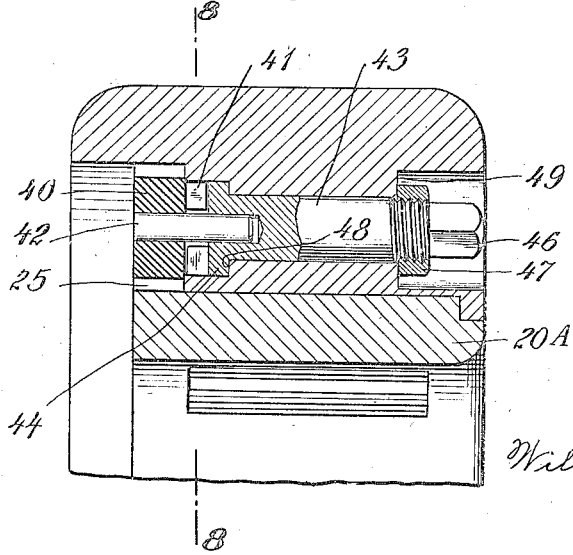
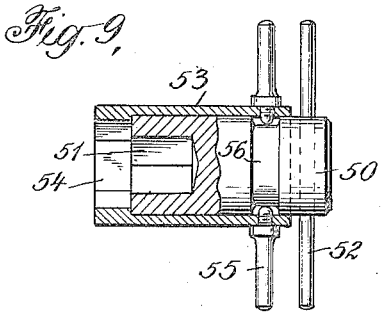

WILHELM B. BRONANDER, OF MONTCLAIR, NEW JERSEY.

CHUCK.

1,424,235.  Specification of Letters Patent.  Patented Aug. 1, 1922.

Application filed July 10, 1918. Serial No. 244,226.

*To all whom it may concern:*

Be it known that I, WILHELM B. BRONANDER, a citizen of the United States of America, and a resident of Montclair, Essex County, and State of New Jersey, have invented certain new and useful Improvements in Chucks, of which the following is a specification, reference being had to the accompanying drawings, forming a part thereof.

My invention relates to chucks and its object is to provide a chuck of simple, strong and inexpensive construction which is capable of holding a piece of work very securely between its jaws.

Another object is to provide a chuck with floating jaws or lost motion which is automatically taken up by the resistance to the cutting tool and so arranged that this motion is used to tighten the jaws against the piece of work.

In order that my invention may be thoroughly understood I will now proceed to describe the same in the following specification, and will then point out the novel features thereof in appended claims.

Referring to the drawings:

Figure 1 is a sectional elevation of a chuck made according to and embodying this invention with a shell held therein.

Figure 2 is a sectional elevation of the chuck.

Figure 3 is a sectional elevation of the same chuck, the section being taken on the line 3—3 of Figure 2.

Figure 4 is a perspective view of one of the parts of the chuck.

Figure 5 is a view corresponding with Figure 2, of a chuck of modified construction which also embodies the invention.

Figure 6 is an end elevation of another form of chuck which also embodies my invention.

Figure 7 is an enlarged transverse section of a part of the chuck shown in Figure 6.

Figure 8 is an enlarged sectional end elevation of some of the parts shown in Figure 7, the section being taken on the line 8—8 of Figure 7.

Figure 9 is a horizontal elevation mostly in section, of a socket wrench for the form of chuck which is shown in Figures 7 and 8.

Like characters of reference designate corresponding parts in all the figures.

10 designates a housing, the outer surface of which is cylindrical, which is adapted to be secured to the end of a hollow lathe spindle 11 by bolts 12. 13 is a cylindrical bore in this housing in which is rotatively supported an annular actuating ring 20. In the periphery of this ring gear teeth 21 are cut. 30 is a low pitch worm in mesh with these teeth. This is in a transverse pocket 14 in the housing. 15 is another pocket in axial alignment with the housing but separated therefrom by a wall 16 in which is a bore which forms a bearing for the shank 31 of the worm, the outer end of which is flattened for the reception of a wrench.

A part of the pocket 14 is threaded to receive a collar 17 which forms a bearing for the other shank 32 of the worm, the end of which is also flattened as shown. A thrust washer or anti-friction bearing 33 is interposed between the hub 34 of the worm and the adjacent surface of the wall 16. A space is left at 35 between the other hub 36 of the worm and the adjacent surface of the collar 17.

At spaced intervals the inner face of the bore 13 of the housing is cut away to form eccentric cam surfaces 18. In this case three of such surfaces are provided.

The actuating ring 20 is constructed to form equally spaced openings 22, corresponding in number with the cam surfaces 18. The cam jaws 23 fit into these openings in such a manner that they are free to move in or out radially, but are restrained against circumferential movement relative to the actuating ring. The outer surfaces of these jaws are shaped to fit the cam surfaces 18 of the housing, against which they are pressed by spiral springs 24.

When the jaws 23 are against the parts of the cams 18 which are farthest from the center of the chuck, or in the positions in which they are shown in Figure 2, a piece of work such as a shell 19, shown in Figure 1, may be inserted between them. Then the worm 30 is turned in the direction to move the actuating ring 20 and the jaws 23 in a clockwise direction. The eccentricity of the guides causes the jaws 23 to be forced inwardly against the shell. In doing this the thrust of the worm comes against the thrust washer 33.

Now when the lathe spindle 11 is driven in an anti-clockwise direction and a tool such for example, as a reamer is inserted, the resistance of the shell to the reamer causes the jaws 23 and the actuating ring 20 to move further in a clockwise direction, and the worm 30 moves with them and lessens the space 35 between hub 36 and collar 17. This results in moving the jaws inwardly to effect a most powerful grip upon the shell.

When it is desired to disengage the shell, the worm may be rotated in the opposite direction if necessary, but usually a jar on the shell as by a hammer blow, is sufficient to move the worm and ring back and as the initial grip necessary to first engage the shell is a light one, such a jar is found to be sufficient to disengage the shell.

In the form of the invention shown in Figure 5, the worm 30 is held against longitudinal movement by two antifriction thrust bearings 37 and 38, the collar 17 in this case being screwed up into contact with hub 36. The openings 22$^A$ in the rotating ring 20 are, however, longer than the jaws 23$^A$ which are pushed back against the ends of these openings which are nearest to the deepest part of the cam surfaces 18 by springs 24$^A$.

The initial grip of the jaws is obtained in the manner previously described. But in this case the final hold results from a circumferential movement of the jaws in relation to the actuating ring.

The chuck shown in Figures 6–8 comprises a housing 10 and an actuating ring 20$^A$ similar to the parts shown in the preceding figures except that in this case spur gear teeth 25 are provided at one edge of the ring. In a recess in the housing is a pinion 40 which meshes with these teeth. This pinion has two lugs 41, projecting from it and a center pin 42.

43 is an actuating spindle rotatably supported in the housing having at one end an enlarged head 44 from which project points, a pair of lugs 45, which fit between the pinion lugs 41 but do not fill the space between them. The center pin 42 extends into a central bore in the end of this spindle. The other end of the spindle is squared as as 46 to receive a socket wrench. It is also threaded to receive a hexagonal nut 47.

A socket wrench for manipulating this chuck is shown in Figure 9. This comprises a cylindrical member 50 in one end of which is a socket 51 arranged to fit the squared end 46 of spindle 43, and a transverse bar 52 near its other end. A sleeve 53 surrounds the member 50. This has a socket 54 in one end which fits the nut 47. The handles 55 are screwed into this sleeve and extend through it slightly into a groove 56 to prevent the separation of the member 50 and sleeve 53 without interfering with their relative rotation.

To move the actuating ring 20$^A$ and the jaws 23 into engaging position, the spindle 43 is turned by the wrench member 50 in an anti-clockwise direction as viewed in Figure 8. This turns the ring 20$^A$ and forces the jaws inwardly. After the jaws grip the piece between them the wrench sleeve 53 is turned to force the nut 47 against the shoulder 49. This pulls the enlarged head 44 of the spindle back against the shoulder 48 and locks the spindle against rotation. This prevents the actuating ring from moving backwardly to loosen the jaws, but on account of the space between the lugs 41 and 45 it is free to move forwardly, which it does when the piece held between the jaws rotates in relation to the housing.

In the various forms shown, the jaws are interchangeable so that when the teeth 21 or 25 become worn, the actuating ring may be rotated 120 degrees to bring another set of these teeth in engagement with the worm 30 on the pinion 40.

Structures of preferred form and construction have been illustrated and described for the purpose of showing ways in which this invention may be used, but the inventive thought upon which this application is based, is broader than these illustrative embodiments, and I therefore intend no limitations other than those imposed by the appended claims.

What I claim is:

1. A chuck comprising a housing having a plurality of spaced eccentric cam surfaces, an actuating ring rotatively mounted in the housing, said ring being constructed with openings, gear teeth on the periphery of the ring, gripping jaws in said openings movable with the ring and over said cam surfaces, a spur-toothed pinion in mesh with said gear teeth, an actuating spindle for the pinion, means for locking the spindle against rotation, and a lost motion connection between the spindle and the pinion.

2. A chuck comprising a housing having a plurality of spaced eccentric cam surfaces, an actuating ring rotatively mounted in the housing, said ring being constructed with openings, gear teeth on the periphery of the ring, gripping jaws in said openings movable with the ring and over said cam surfaces, a spur-toothed pinion in mesh with said gear teeth, an actuating spindle for the pinion, a lost motion connection between the spindle and the pinion, a lock nut on said spindle, and means for independently rotating the spindle and the lock nut.

In witness whereof, I have hereunto set my hand this 9 day of July, 1918.

W. B. BRONANDER.